(12) United States Patent
Hunter et al.

(10) Patent No.: US 9,828,204 B1
(45) Date of Patent: Nov. 28, 2017

(54) INTERFACE HOUSINGS TO COUPLE A SCANNER AND A SHEET STACKER

(71) Applicant: Scantron Corporation, Eagan, MN (US)

(72) Inventors: Shawn Hunter, Eagan, MN (US); Steve Olson, Crystal, MN (US); Bill Kantos, Apple Valley, MN (US); Alan Stoddard, Maple Grove, MN (US)

(73) Assignee: Scantron Corporation, Eagan, MN (US)

( * ) Notice: Subject to any disclaimer, the term of this patent is extended or adjusted under 35 U.S.C. 154(b) by 0 days.

(21) Appl. No.: 15/164,699

(22) Filed: May 25, 2016

(51) Int. Cl.
| | | |
|---|---|---|
| *B65H 31/22* | (2006.01) | |
| *B65H 37/00* | (2006.01) | |
| *H04N 1/00* | (2006.01) | |

(52) U.S. Cl.
CPC ............ *B65H 31/22* (2013.01); *B65H 37/00* (2013.01); *H04N 1/00631* (2013.01); *H04N 1/00907* (2013.01); *B65H 2402/62* (2013.01)

(58) Field of Classification Search
CPC B65H 31/22; B65H 2402/10; B65H 2402/30; B65H 2402/34; B65H 2402/60; B65H 2402/62; B65H 2402/63; B65H 2405/31; B65H 2801/39; H04N 1/00631; H04N 1/00907; H04N 1/00525; H04N 1/00538; H04N 1/00541; H04N 1/00557
USPC .......................................... 271/207; 358/498
See application file for complete search history.

(56) References Cited

U.S. PATENT DOCUMENTS

| 6,829,004 B1* | 12/2004 | Abe .................... H04N 1/00249 348/373 |
|---|---|---|
| 7,184,182 B1* | 2/2007 | Kuroda .............. H04N 1/00525 358/296 |
| 8,833,757 B1* | 9/2014 | Piening ................ B65H 3/0684 271/121 |
| 2002/0163118 A1* | 11/2002 | Inoue ....................... B65H 5/38 271/162 |
| 2003/0025263 A1* | 2/2003 | Koga ........................ B65H 3/44 271/9.12 |
| 2005/0074266 A1* | 4/2005 | Hiramoto ................. B65H 3/44 399/391 |
| 2012/0111988 A1* | 5/2012 | Dean .................... B65H 16/005 242/597.6 |

(Continued)

*Primary Examiner* — David H Bollinger
(74) *Attorney, Agent, or Firm* — Fish & Richardson P.C.

(57) ABSTRACT

Some examples of a document scanning system can include a scanner and a sheet output stacker. The stacker includes an upper surface configured to mate with the scanner configured to scan and transfer contents of a paper document. The stacker is configured to receive paper sheets from the scanner. The stacker includes multiple, upward extending interface housings positioned on the upper surface. The multiple interface housings are configured to be received in respective multiple receiving structures in the scanner, and are configured to mechanically and electrically couple the sheet output stacker and the scanner. The interface housings allow care-free electrical and mechanical pairing of a scanner to a stacker with no tools or adjustments. Simply positioning the scanner on the stacker such that the interface housings are aligned with the receiving structures results in the scanner being automatically guided into place and connected to the stacker through gravity.

21 Claims, 8 Drawing Sheets

(56) References Cited

U.S. PATENT DOCUMENTS

| | | | |
|---|---|---|---|
| 2013/0009359 A1* | 1/2013 | Yamada | G03G 15/6502 271/264 |
| 2013/0334762 A1* | 12/2013 | Matsuoka | B65H 5/06 271/4.01 |
| 2014/0001696 A1* | 1/2014 | Yoshida | B65H 5/00 271/9.01 |
| 2014/0319761 A1* | 10/2014 | Komuro | B65H 31/20 271/223 |

* cited by examiner

INTERFACE HOUSINGS TO COUPLE A SCANNER AND A SHEET STACKER

TECHNICAL FIELD

This disclosure relates to a document scanning system that includes a scanner and a sheet stacker.

BACKGROUND

Image reading devices, for example, a scanner, a copy machine, a printer, a facsimile machine, or other image reading devices, can receive a document having content (for example, images, text, combinations of them) and electronically process the content. For example, the copy machine can copy the content onto a sheet of paper. The scanner can convert the content into electronic format. Sometimes, it is desirable to electronically process content from multiple such documents. Sheet output stackers can receive multiple such documents. To do so, the image reading device and the sheet output stacker need to be mechanically and electrically coupled.

SUMMARY

This disclosure relates to interface housings to couple a scanner and a sheet stacker.

Certain aspects of the subject matter described here can be implemented as a sheet output stacker. The stacker includes an upper surface configured to mate with a scanner that is configured to scan and transfer contents of a paper document. The stacker is configured to receive paper sheets from the scanner. The stacker includes multiple interface housings positioned on the upper surface. Each interface housing extends upward from the upper surface. The multiple interface housings are configured to be received in respective multiple receiving structures in the scanner, and are configured to mechanically and electrically couple the sheet output stacker and the scanner.

This, and other aspects, can include one or more of the following features. The multiple interface housings can include a first interface housing and a second interface housing, each positioned on top of the upper surface. The first interface housing can be spaced apart from the second interface housing. The first interface housing can include a power strip positioned in an aperture formed on an upper interface surface of the first interface housing. The power strip can be configured to provide electrical power to the scanner. Electrical connection components can extend from the power strip downward and through the first interface housing, and be connected to components of the sheet feeding stacker. Each interface housing can include an upper interface surface and a lower interface surface connected to the upper interface surface by an interface side body. The upper interface surface of each interface housing can include a respective first straight edge, a respective second semi-circular edge attached end-to-end to the respective first straight edge, a respective third straight edge attached end-to-end to the respective second semi-circular edge, and a respective fourth semi-circular edge attached end-to-end to the respective third straight edge and attached end-to-end to the respective first straight edge. The respective first straight edge and the respective third straight edge can be parallel to each other. The lower interface surface of each interface housing can include a respective fifth edge, a respective sixth semi-circular edge attached end-to-end to the respective first straight edge, a respective seventh straight edge attached end-to-end to the respective sixth semi-circular edge, and a respective eighth semi-circular edge attached end-to-end to the respective third straight edge and attached end-to-end to the respective fifth straight edge. The respective fifth straight edge and the respective seventh straight edge can be parallel to each other. The upper interface surface can be parallel to the lower interface surface. A surface area within edges of the upper interface surface can be less than a surface area within edges of the lower interface surface. The interface side body can extend downwards and away from edges of the upper interface surface toward edges of the lower interface surface.

Certain aspects of the subject matter described here can be implemented as a document scanning system. The system includes a scanner configured to scan a paper document. The scanner includes multiple receiving structures on a scanner bottom surface. The system includes a sheet output stacker. The stacker includes an upper surface and multiple interface housings positioned on the upper surface. Each interface housing extends upward from the upper surface. The multiple interface housings are configured to be received in the respective multiple receiving structures in the scanner bottom surface configured to be positioned on the upper surface when the scanner is mounted atop the sheet output stacker. The multiple interface housings are configured to mechanically and electrically couple the sheet output stacker and the scanner.

This, and other aspects, can include one or more of the following features. The multiple interface housings can include a first interface housing and a second interface housing having the same shape as the first interface housing. The first interface housing and the second interface housing can be separated from each other on the upper surface of the sheet output stacker. The first interface housing can include a power strip positioned in an aperture formed on an upper interface surface of the first interface housing. The power strip can be configured to provide electrical power to the scanner. Electrical connection components can extend from the power strip downward and through the first interface housing. The electrical connection components can be connected to components of the sheet output stacker. Each interface housing can include an upper interface surface and a lower interface surface connected to each other by an interface body. The upper interface surface can be parallel to the lower interface surface. The lower interface surface can be attached to the upper surface. The upper interface surface can be positioned above the upper surface. Each of the upper interface surface and the lower interface surface can be stadium shaped and include a rectangular cross-section with semi-circles at a pair of opposite sides. A surface area covered between edges of the upper interface surface can be less than a surface area covered between edges of the lower interface surface. The interface body can extend downward and away from edges of the upper interface surface and can attach to edges of the lower interface surface.

Certain aspects of the subject matter described here can be implemented as a sheet output stacker. The stacker includes a rectangular upper surface configured to receive a scanner configured to scan paper documents. The stacker is configured to receive the paper sheets from the scanner. The rectangular upper surface includes a first pair of parallel edges and a second pair of parallel edges longer than the first pair of parallel edges. The stacker includes a pair of interface housings positioned on the upper surface. Each interface housing extends upward from the upper surface. Each interface housing has a stadium-shaped cross-section and includes a rectangular portion with semi-circles at a pair of opposite sides. The rectangular portion of each interface housing is parallel to the first pair of parallel edges of the rectangular upper surface. The pair of interface housings is configured to be received in a respective pair of openings in the scanner. The pair of interface housings is configured to mechanically and electrically couple the sheet output stacker and the scanner.

This, and other aspects, can include one or more of the following features. The pair of interface housings can include a first interface housing and a second interface housing, each positioned on top of the upper surface. The first interface housing can be spaced apart from the second interface housing. The first interface housing can include a power strip positioned in an aperture formed on an upper interface surface of the first interface housing. The power strip can be configured to provide electrical power to the scanner. Electrical connection components can extend from the power strip downward and through the first interface housing. The electrical connection components can be connected to components of the sheet output stacker. The stadium-shaped cross-section of each interface housing coupled with gravity can be sufficient to mechanically couple the sheet output stacker and the scanner.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a document scanning system that includes a scanner to scan contents of a document and a sheet output stacker configured to couple with the scanner and to receive the paper sheets from the scanner. As described below, the scanner and the sheet output stacker can be coupled (electrically and mechanically) by a pair of interface housings attached to the stacker. The shape of each interface housing coupled with gravity is sufficient to mechanically couple the scanner to the stacker. A power strip positioned in one of the interface housings electrically couples the scanner to the stacker allowing power and data to be exchanged between the scanner and the stacker. In this manner, the scanner and the stacker form a mated pair coupled by the interface housings. The scanner and the stacker can be de-coupled by simply manually lifting the scanner from the stacker. The separated scanner can be used independently to scan documents without the automated stacking provided by the stacker unit.

The interface housings described in this disclosure enable electrical and mechanical coupling any scanner and any stacker in an interchangeable manner. That is, any stacker that includes the pair of interface housings can be interchangeably coupled to any scanner that is configured to receive the pair of interface housings, provided that both the scanner and stacker are capable of mechanically and electrically providing the required functions. The scanner and the stacker can be coupled simply by positioning the scanner over the stacker and letting gravity lower the scanner onto the stacker. The shape of the interface housings and gravity completes the mechanical coupling without requiring additional steps such as latching, tightening of screws or other types of fastening to complete the coupling. The inclusion of a power strip in one of the interface housings completes electrical coupling without requiring additional steps such as selection of separate power options. In this manner, the interface housings enable fast coupling and de-coupling of the scanner and the stacker.

A pair of interface housings are described below and shown in the drawings to enable mechanical and electrical coupling between the scanner and the stacker. In alternative or additional implementations, similar mechanical and electrical coupling can be achieved using only one interface housing or more than two interface housings. Also, the disclosure describes a scanner coupled to a sheet output stacker. In alternative or additional implementations, the sheet output stacker can be coupled to other image reading devices, for example, a copy machine, a printer, a facsimile machine or other image reading devices.

Figure 1:
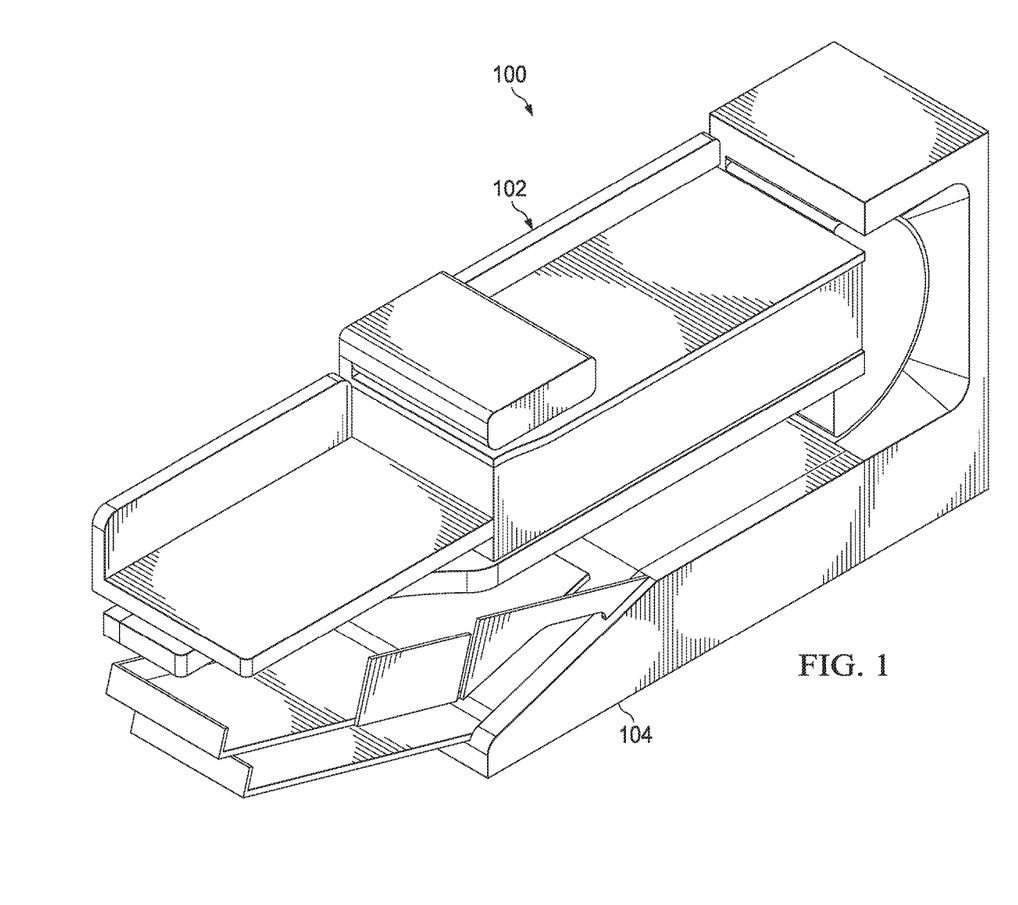
FIG. 1 is a schematic diagram of a document scanning system, shown coupled with a sheet output stacker

FIG. 1 is a schematic diagram of a document scanning system 100. The system 100 includes a scanner 102 to scan and electronically extract contents of a paper document. As described below, the scanner includes multiple receiving structures (for example, a pair of receiving structures) on a scanner bottom surface. The system 100 includes a sheet output stacker 104 to receive multiple sheets of paper. When coupled to the scanner 102, the stacker 104 receives the sheets of paper (for example, one sheet at a time) from the scanner 102. The scanner 102 includes a paper input and pick mechanism that reliably pulls (or picks) a single sheet of paper at a time, scans it, and sends it to the stacker 104 which receives each sheet. The scanner 102 includes read heads (not shown) to scan (that is, take a picture of) a top and bottom of the sheet of paper. In some implementations, the scanner 102 can include a printer that can print information on the scanned sheet of paper. In some implementations, the stacker 104 includes a turn-around mechanism to turn the scanned paper over so that the order of the scanned sheets is maintained. The stacker 104 also includes two output trays (hoppers) into which the scanned sheets are shunted. The stacker 104 can physically separate erroneous or "special" sheets from "normal" sheets and shunt the separated sheets to the output trays.

Figure 2:
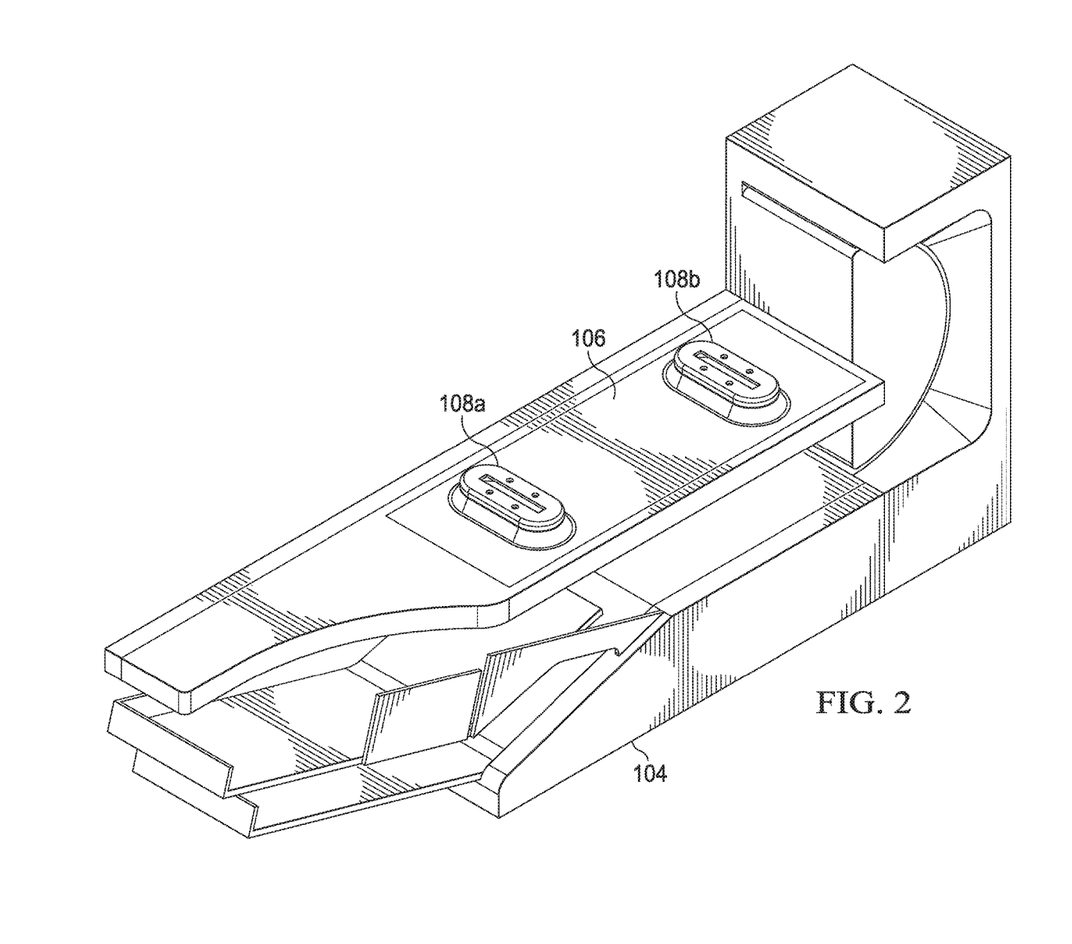
FIG. 2 is a schematic diagram of a sheet output stacker, shown uncoupled from the scanner itself, including a pair of interface housings.

FIG. 2 is a schematic diagram of the sheet output stacker 104 including a pair of interface housings (a first interface housing 108a, a second interface housing 108b). An upper surface 106 of the stacker 104 can receive a scanner (for example, the scanner 102). The pair of interface housings are positioned on (for example, attached to) the upper surface 106. Each interface housing extends upward from the upper surface 106, for example, toward the scanner 102. The pair of interface housings are received in a respective pair of receiving structures in the scanner 102. As described below, the pair of interface housings mechanically and electrically couple the scanner 102 and the stacker 104. As shown in FIG. 2, each of the first interface housing 108a and the second interface housing 108b are positioned on top of the upper surface 106, and are spaced apart from each other. Each interface housing is convex, that is, projecting upward and away from the upper surface 104.

Figure 3:
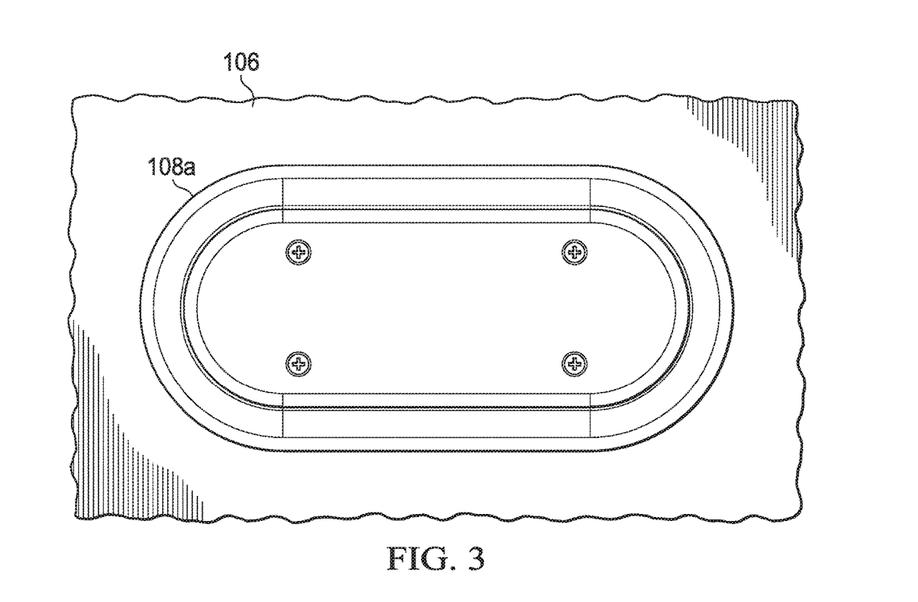
FIG. 3 is a schematic diagram of a first interface housing of the pair of interface housings.
Figure 4:
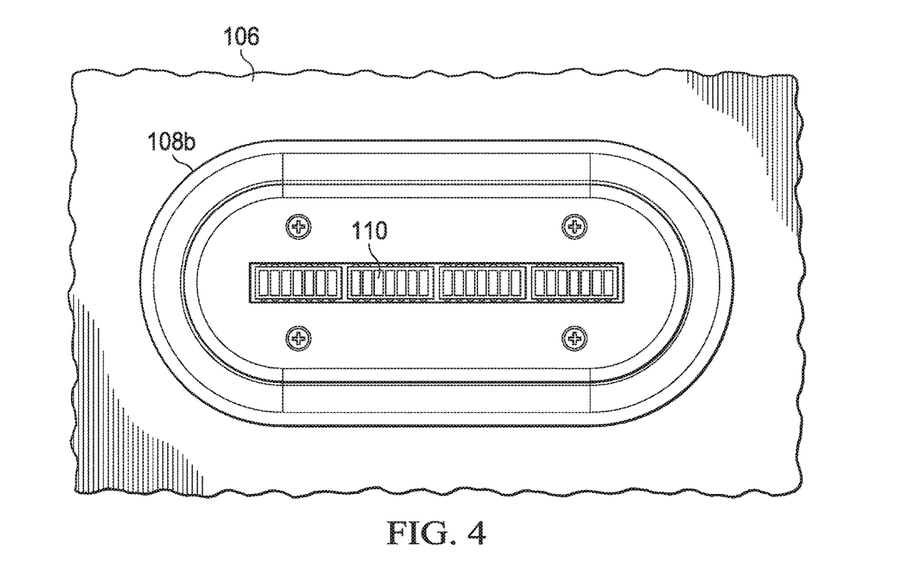
FIG. 4 is a schematic diagram of a second interface housing, containing electrical connections, of the pair of interface housings.

FIG. 3 is a schematic diagram of the first interface housing 108a attached to the upper surface 106. FIG. 4 is a schematic diagram of the second interface housing 108b attached to the upper surface 106. As shown in FIG. 2, the upper surface 106 of the stacker 104 includes a rectangular portion. The pair of interface housings are positioned apart from each other along a length of the rectangular portion. In some implementations, the two interface housings can have the same shape allowing an interface housing to be interchangeably positioned either on the left or the right of the upper surface 106.

Figure 5:
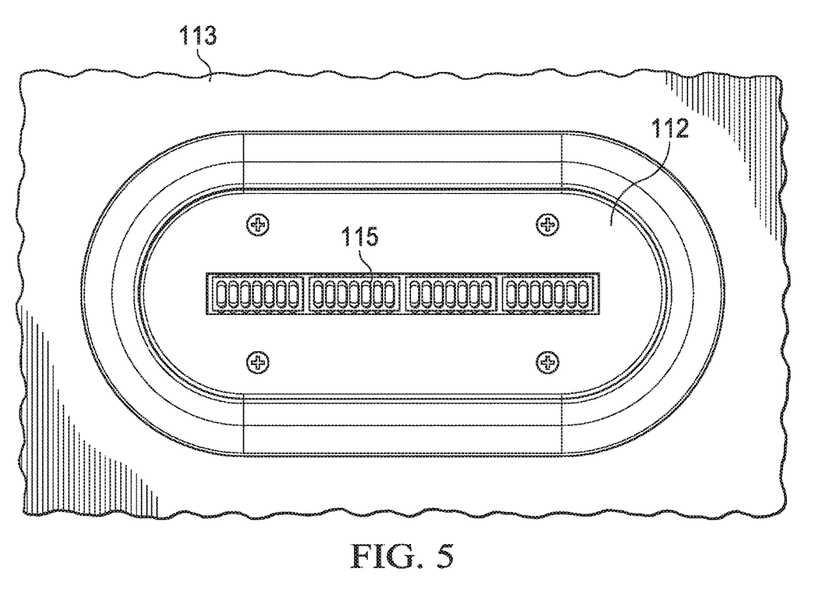
FIG. 5 is a schematic diagram of a receiving structure in the scanner to receive a sheet output stacker interface housing.

FIG. 5 is a schematic diagram of a receiving structure 112 in the scanner 102 to receive an interface housing. The bottom surface 113 of the scanner 104 can includes two receiving structures, each to receive one of the pair of interface housings. Each receiving structure can have a shape that complements the shape of the interface housing. For example, each receiving structure can include a concave shape recessed into the bottom surface 113 of the scanner to receive the convex, upward protruding shape of the interface housing. When the pair of interface housings on the upper surface 106 of the stacker 104 are received in the recessed receiving structures on the bottom surface 113 of the scanner 102, the scanner 102 can be substantially flat on the stacker 104 with the bottom surface 113 of the scanner 102 contacting the upper surface 106 of the stacker 104. Also, as described below, each interface housing and each receiving structure can be shaped such that the scanner 102 lowers automatically with gravity to couple with the stacker 104 under a weight of the scanner 102.

In some implementations, one of the interface housings (for example, the second interface housing 108b) can include a power strip 110 positioned in an aperture formed on an upper surface of the interface housing. Electrical connection components extend from the power strip 110 downward and through the interface housing. The electrical connection components are connected to components of the stacker 104. Power and data to operate the scanner 102 are exchanged between the scanner 102 and the stacker 104 through the power strip 110. The receiving structure 112 that receives the interface housing including the power strip 110 can include a power strip (for example, power strip 115). When the second interface housing 108b is positioned within the receiving structure 112, the power strip 110 in the second interface housing 108b can contact the power strip 115 in the receiving structure 112 to transfer power and data between the scanner 102 and the stacker 104.

Figure 6A:
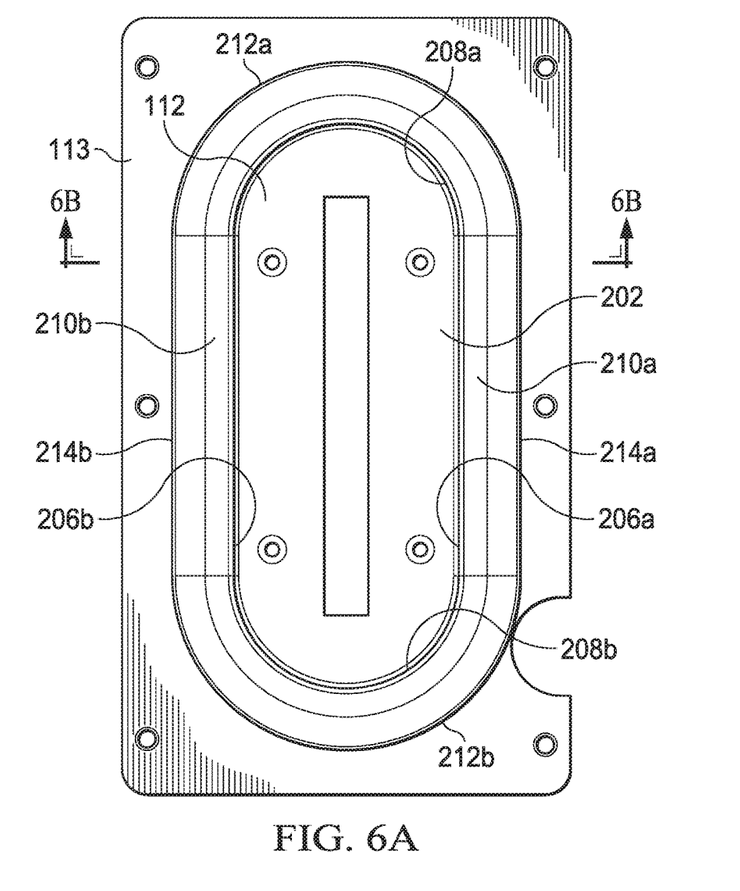
FIG. 6A is a top view of a receiving structure in the scanner.
Figure 6B:
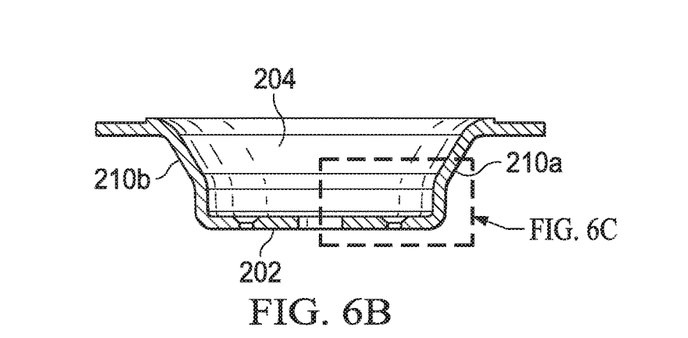
FIG. 6B is a side view of the receiving structure of FIG. 6A.
Figure 6C:
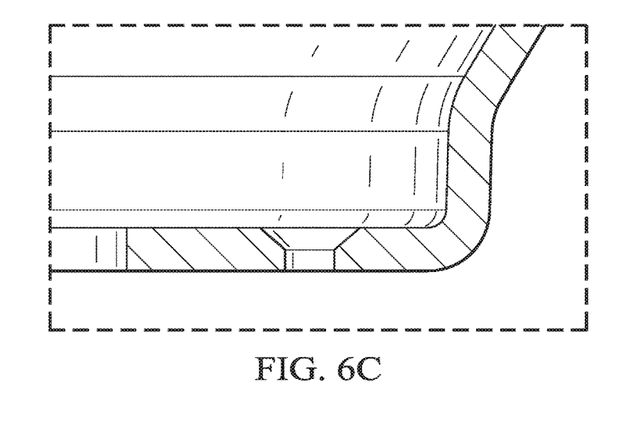
FIG. 6C is an expanded view of a section of the receiving structure of FIG. 6A.
Figure 6D:
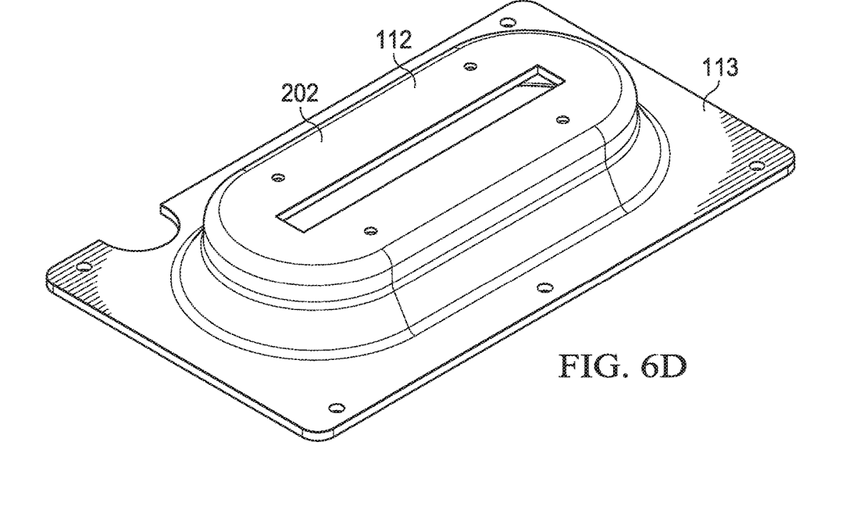
FIG. 6D is a perspective view of the receiving structure of FIG. 6A.

FIG. 6A is a top view of a receiving structure 113 in the scanner 102. FIG. 6B is a side view of the receiving structure 113. FIG. 6C is an expanded view of a section of the receiving structure 113. FIG. 6D is a perspective view of the receiving structure 113. Certain structural details of each receiving structure are described below with reference to FIGS. 6A-6D. For ease of understanding, the receiving structure 113 is shown upside down compared to the orientation of the receiving structure 113 when mated with the counterpart interface housing. The receiving structure 113 has a concave, recessed shape with a bottom surface 202 and an opening 204 above the bottom surface 202 and connected to the bottom surface 202 by a side surface. The side view of the receiving structure 113 shows the side surface curving inward and away from the opening 204 toward the bottom surface 202. When mated with the counterpart interface housing, the side surface curves downward, outward and away from the bottom surface 202 toward the opening 204.

The receiving structure 112 is a bevel-shaped female part. The bottom portion 202 of the receiving structure 112 includes a straight right edge 206a and a straight left edge 206b opposite and parallel to the straight right edge 206a. Top ends of the straight edges are joined by a curved edge 208a (for example, semi-circular edge or other curved edge). Bottom ends of the straight edges are joined by a curved edge 208b (for example, semi-circular edge or other curved edge). The opening 204 of the receiving structure 112 is formed by a straight right edge 214a and a straight left edge 214b opposite and parallel to the straight right edge 214a. Top ends of the straight edges are joined by a curved edge 212a. Bottom ends of the straight edges are joined by a curved edge 212b. A surface area occupied by the opening 204 between its four edges is greater than a surface area occupied by the bottom surface 202 between its four edges.

Figure 7A:
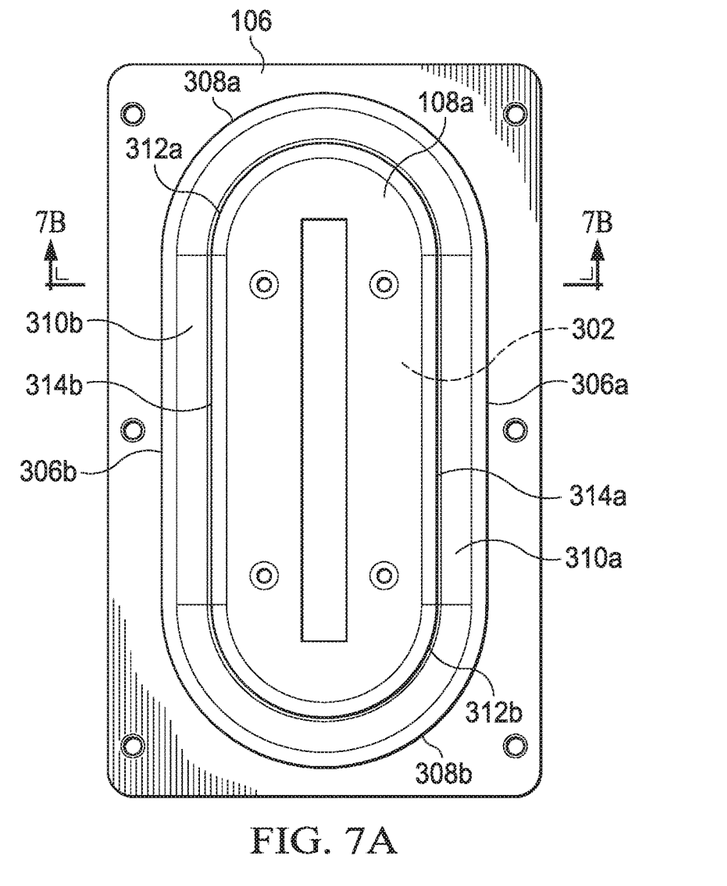
FIG. 7A is a top view of an interface housing in the stacker.
Figure 7B:
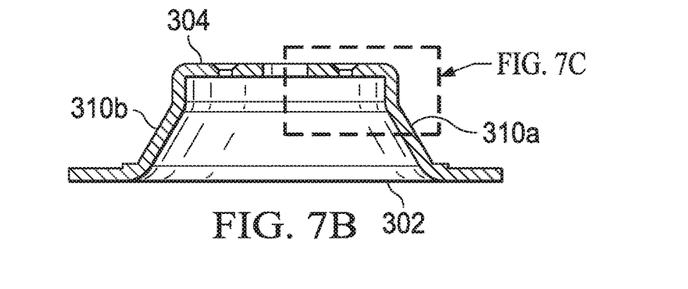
FIG. 7B is a side view of the interface housing of FIG. 7A.
Figure 7C:
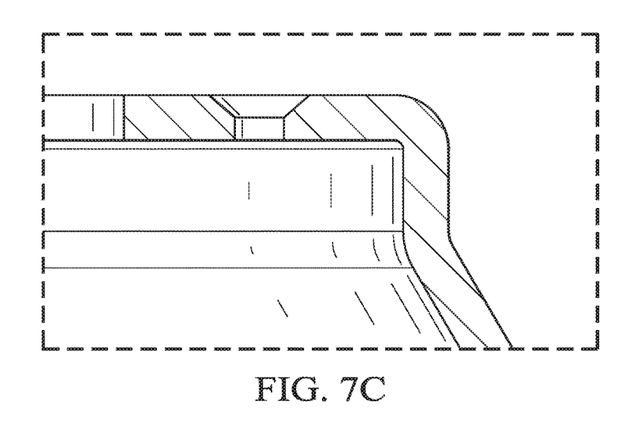
FIG. 7C is an expanded view of a section of the interface housing of FIG. 7A.
Figure 7D:
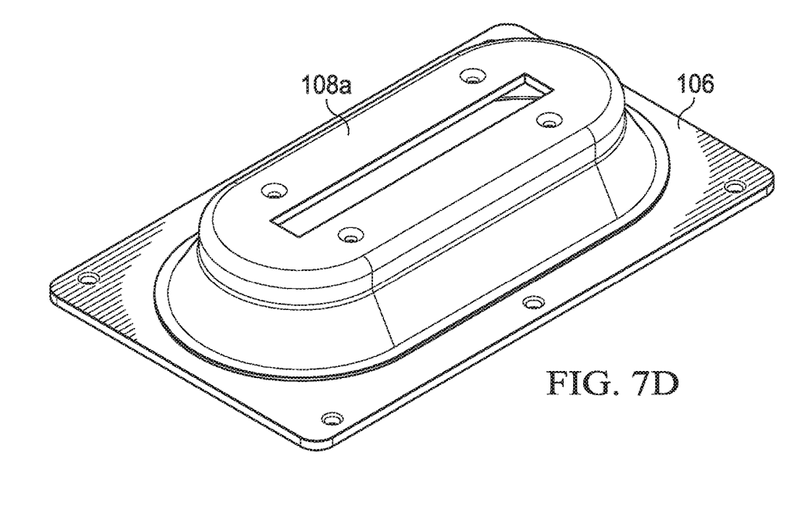
FIG. 7D is a perspective view of the interface housing of FIG. 7A.

FIG. 7A is a top view of the interface housing 108a in the stacker 104. FIG. 7B is a side view of the interface housing 108a. FIG. 7C is an expanded view of a section of the interface housing 108a FIG. 7D is a perspective view of the interface housing 108a. Certain structural details of each interface housing are described below with reference to FIGS. 7A-7D, respectively. The interface housing 108a has a convex, upward-projecting shape with a bottom surface 302 and an upper surface 304 above the bottom surface 302 and connected to the bottom surface 302 by a side surface. The bottom surface 302 and the upper surface 304 are parallel to each other. The side view of the interface housing 108a shows the side surface curving outward and away from the upper surface 304 toward the bottom surface 202. When mated with the counterpart receiving structure, the side surface curves downward, outward and away from the bottom surface 302 toward the upper surface 304.

The interface housing 108a is a bevel-shaped male part having a stadium shape. The stadium shape is defined by the bottom portion 302 of the interface housing 108a which includes a straight right edge 306a and a straight left edge 306b opposite and parallel to the straight right edge 306a. Top ends of the straight edges are joined by a curved edge 308a (for example, semi-circular edge or other curved edge). Bottom ends of the straight edges are joined by a curved edge 308b (for example, semi-circular edge or other curved edge). The upper surface 304 of the interface housing 108a is formed by a straight right edge 314a and a straight left edge 314b opposite and parallel to the straight right edge 314a. Top ends of the straight edges are joined by a curved edge 312a. Bottom ends of the straight edges are joined by a curved edge 312b. A surface area occupied by the upper surface 304 between its four edges is greater than a surface area occupied by the bottom surface 302 between its four edges.

The bottom surface 113 of the scanner 102 can include a rectangular portion. The pair of receiving structures are positioned apart from each other along a length of the rectangular portion, for example, the left and the right of a centerline bisecting the length of the rectangular portion. Similarly, the pair of interface housings are positioned apart from each other along a length of the rectangular portion included in the upper surface 106 of the stacker 104, for example, the left and the right of a centerline bisecting the length of the rectangular portion. As described above, each interface housing is aligned below a respective receiving structure such that the pair of interface housings are received within the pair of receiving structures when the scanner 102 is positioned on top of the stacker 104.

Similarly to the pair of interface housings, the pair of receiving structures can have the same shape allowing a receiving structure to be interchangeably positioned either on the left or the right of the bottom surface 113. Also, each interface housing can be positioned on the upper surface 106 of the stacker such that a straight edge of the bottom surface 302 or the upper surface 304 is perpendicular to the length of the rectangular portion included in the upper surface 106 of the stacker 104. Similarly, each receiving structure can be positioned on the bottom surface 113 of the scanner 102 such that a straight edge of the opening 204 or the bottom surface 202 is perpendicular to the length of the rectangular portion included in the bottom surface 113 of the scanner 102. In general, each interface housing or each receiving structure can be oriented in any direction on the surface on which the interface housing or the receiving structure is mounted and relative to the other interface housing or receiving structure, respectively, as long as the orientation allows positioning the receiving structures on top of the pair of interface housings.

The interface housings described in this disclosure allow care-free electrical and mechanical pairing of a scanner (for example, the scanner 102) to a stacker (for example, the stacker 104) with no tools or adjustments. Simply positioning the scanner on the stacker such that the interface housings are aligned with the receiving structures results in the scanner being automatically guided into place and connected to the stacker through gravity. Such a coupling is enabled by the rounded-bevel shape of the interface housings which include electrical connectors to exchange power and data between the scanner and the stacker. In alternative or additional implementations, the interface housing can have any shape that allows lowering the scanner 102 onto the stacker 104 and that includes structural features (either in the interface housing or the receiving structure or both) to guide the scanner 102 onto the stacker 104.

Thus, particular implementations of the subject matter have been described. Other implementations are within the scope of the following claims.

The invention claimed is:

1. A sheet output stacker comprising:
an upper surface for mating with a scanner configured to scan and transfer contents of a paper document, the sheet output stacker configured to receive paper sheets from the scanner; and
a plurality of interface housings positioned on the upper surface, each interface housing extending upward from the upper surface, the plurality of interface housings for receiving in a respective plurality of receiving structures in the scanner, the plurality of interface housings configured to mechanically couple the sheet output stacker and the scanner, the plurality of interface housing comprising electrical connectors to electrically couple the sheet output stacker and the scanner.

2. The stacker of claim 1, wherein the plurality of interface housings comprises a first interface housing and a second interface housing, each positioned on top of the upper surface, wherein the first interface housing is spaced apart from the second interface housing.

3. The stacker of claim 2, wherein the first interface housing comprises the electrical connector comprising a power strip positioned in an aperture formed on an upper interface surface of the first interface housing, the power strip configured to provide electrical power to the scanner, wherein electrical connection components extend from the power strip downward and through the first interface housing, the electrical connection components connected to components of the sheet feeding stacker.

4. The stacker of claim 1, wherein each interface housing comprises an upper interface surface and a lower interface surface connected to the upper interface surface by an interface side body.

5. The stacker of claim 4, wherein the upper interface surface of each interface housing comprises:
a respective first straight edge;
a respective second semi-circular edge attached end-to-end to the respective first straight edge;
a respective third straight edge attached end-to-end to the respective second semi-circular edge; and
a respective fourth semi-circular edge attached end-to-end to the respective third straight edge and attached end-to-end to the respective first straight edge.

6. The stacker of claim 5, wherein the respective first straight edge and the respective third straight edge are parallel to each other.

7. The stacker of claim 5, wherein the lower interface surface of each interface housing comprises:
a respective fifth edge;
a respective sixth semi-circular edge attached end-to-end to the respective first straight edge;
a respective seventh straight edge attached end-to-end to the respective sixth semi-circular edge; and
a respective eighth semi-circular edge attached end-to-end to the respective third straight edge and attached end-to-end to the respective fifth straight edge.

8. The stacker of claim 7, wherein the respective fifth straight edge and the respective seventh straight edge are parallel to each other.

9. The stacker of claim 5, wherein the upper interface surface is parallel to the lower interface surface.

10. The stacker of claim 5, wherein a surface area within edges of the upper interface surface is less than a surface area within edges of the lower interface surface.

11. The stacker of claim 5, the interface side body extends downwards and away from edges of the upper interface surface toward edges of the lower interface surface.

12. A document scanning system comprising:
a scanner configured to scan a paper document, the scanner comprising a plurality of receiving structures on a scanner bottom surface;
a sheet output stacker comprising:
an upper surface; and
a plurality of interface housings positioned on the upper surface, each interface housing extending upward from the upper surface, the plurality of interface housings configured to mechanically couple the sheet output stacker and the scanner by being received in the respective plurality of receiving structures in the scanner bottom surface configured to be positioned on the upper surface when the scanner is mounted atop the sheet output stacker, wherein a first interface housing of the plurality of interface housings comprises a power strip configured to electrically couple the sheet output stacker and the scanner.

13. The system of claim 12, wherein the plurality of interface housings comprises a second interface housing having the same shape as the first interface housing, the first interface housing and the second interface housing separated from each other on the upper surface of the sheet output stacker.

14. The system of claim 12, wherein the power strip is positioned in an aperture formed on an upper interface surface of the first interface housing, the power strip configured to provide electrical power to the scanner, wherein electrical connection components extend from the power strip downward and through the first interface housing, the electrical connection components connected to components of the sheet output stacker.

15. The system of claim 12, wherein each interface housing comprises an upper interface surface and a lower interface surface connected to each other by an interface body, wherein the upper interface surface is parallel to the lower interface surface, wherein the lower interface surface is attached to the upper surface, wherein the upper interface surface is positioned above the upper surface.

16. The system of claim 15, wherein each of the upper interface surface and the lower interface surface is stadium shaped and comprises a rectangular cross-section with semi-circles at a pair of opposite sides.

17. The system of claim 16, wherein a surface area covered between edges of the upper interface surface is less than a surface area covered between edges of the lower interface surface.

18. The system of claim 15, wherein the interface body extends downward and away from edges of the upper interface surface and attaches to edges of the lower interface surface.

19. A sheet output stacker comprising:
a rectangular upper surface configured to receive a scanner configured to scan paper documents, the sheet output stacker configured to receive the paper sheets from the scanner, the rectangular upper surface comprising a first pair of parallel edges and a second pair of parallel edges longer than the first pair of parallel edges; and
a pair of interface housings positioned on the upper surface, each interface housing extending upward from the upper surface, each interface housing having a stadium-shaped cross-section and comprising a rectangular portion with semi-circles at a pair of opposite sides, wherein the rectangular portion of each interface housing is parallel to the first pair of parallel edges of the rectangular upper surface, the pair of interface housings configured to be received in a respective pair of openings in the scanner to mechanically couple the sheet output stacker and the scanner, a first interface housing of the pair of interface housings comprising a power strip configured to electrically couple the sheet output stacker and the scanner.

20. The stacker of claim 19, wherein the pair of interface housings comprises a second interface housing, the first interface housing and the second interface housing positioned on top of the upper surface, wherein the first interface housing is spaced apart from the second interface housing, wherein the power strip is positioned in an aperture formed on an upper interface surface of the first interface housing, the power strip configured to provide electrical power to the scanner, wherein electrical connection components extend from the power strip downward and through the first interface housing, the electrical connection components connected to components of the sheet output stacker.

21. The stacker of claim 19, wherein the stadium-shaped cross-section of each interface housing coupled by gravity is sufficient to mechanically couple the sheet output stacker and the scanner.

* * * * *